Figure 6:
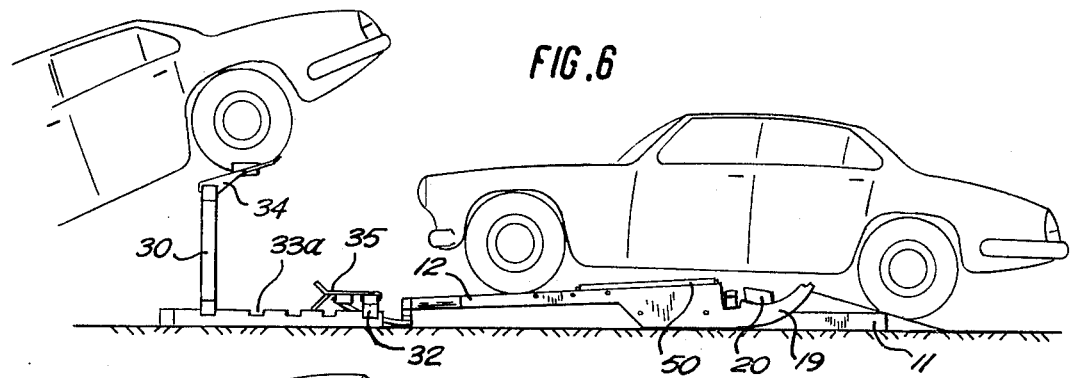

United States Patent [19]

Robinson

[11] 4,030,697
[45] June 21, 1977

[54] VEHICLE JACKS

[76] Inventor: Christopher Thomas Robinson, c/o Sir Thomas Robinson & Son (Grimsby) Ltd., Wharncliffe Road, Fish Docks, Grimsby, DN31 3QQ, Lincolnshire, England

[22] Filed: June 23, 1975

[21] Appl. No.: 589,779

[52] U.S. Cl. .................................. 254/8 R; 254/124
[51] Int. Cl.² ........................................ B66F 11/00
[58] Field of Search ...................... 254/124, 88, 8 R

[56] References Cited

UNITED STATES PATENTS

| 2,166,477 | 7/1939 | Polk et al. | 254/88 |
| 2,489,056 | 11/1949 | Stewart | 254/124 |
| 3,780,987 | 12/1973 | Craft et al. | 254/8 R |
| 3,787,030 | 1/1974 | Bieker | 254/8 R |

*Primary Examiner*—James L. Jones, Jr.
*Assistant Examiner*—Robert C. Watson
*Attorney, Agent, or Firm*—Young & Thompson

[57] ABSTRACT

A jack member onto a pair of which members a vehicle can be driven and then raised to a position inclined to the horizontal. The jack members are used more particularly for stowing vehicles in containers on a number of support frames. The jack members raise the vehicles so that they are supported at an angle to the horizontal with their wheels held in wheel support cradles attached to the frames. The jack members each comprises an approach ramp and a lifting ramp pivotally connected at one of their ends on which the vehicle is initially aligned and supported prior to being elevated at one end for inclined support on the vehicle frame.

9 Claims, 11 Drawing Figures

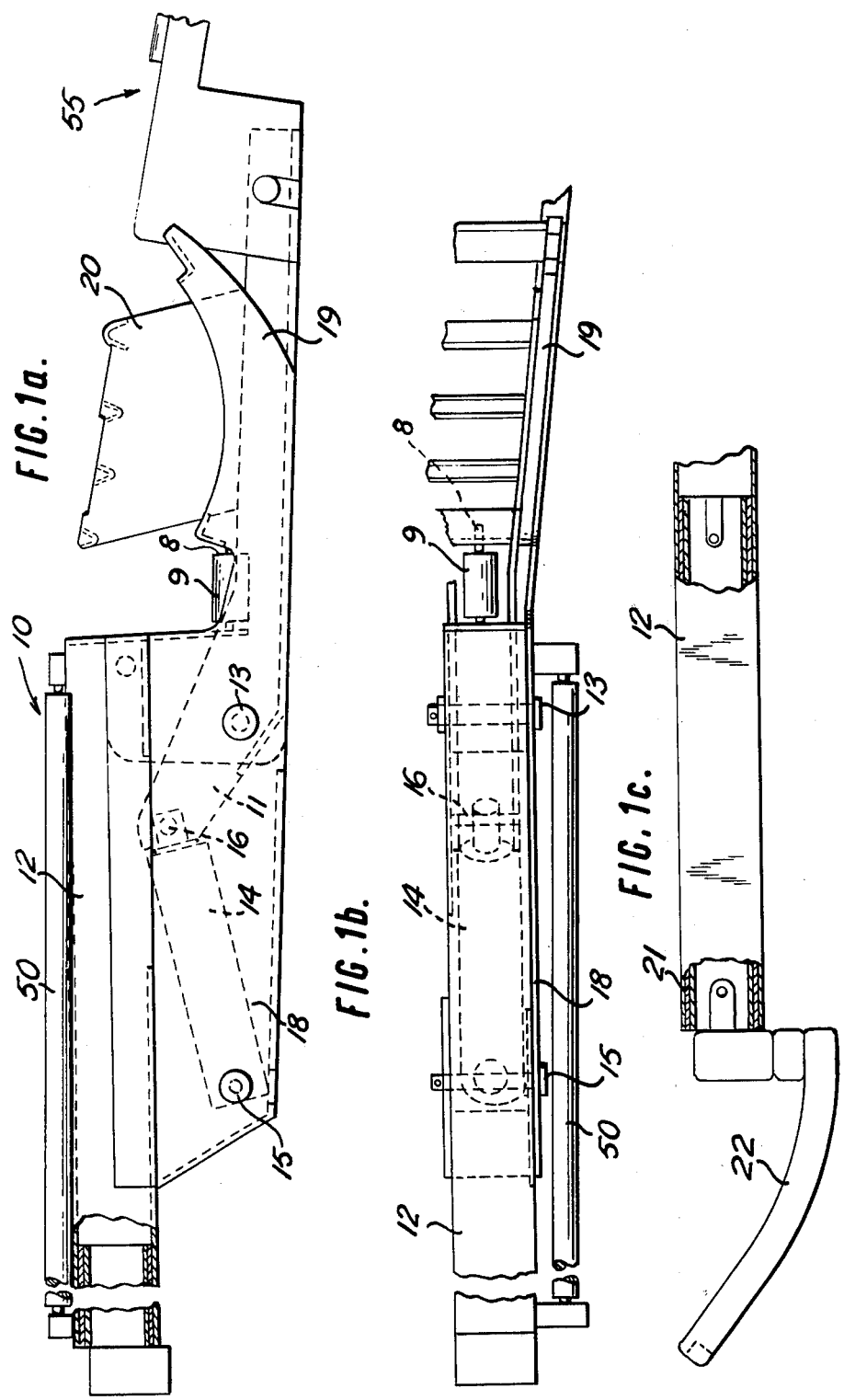

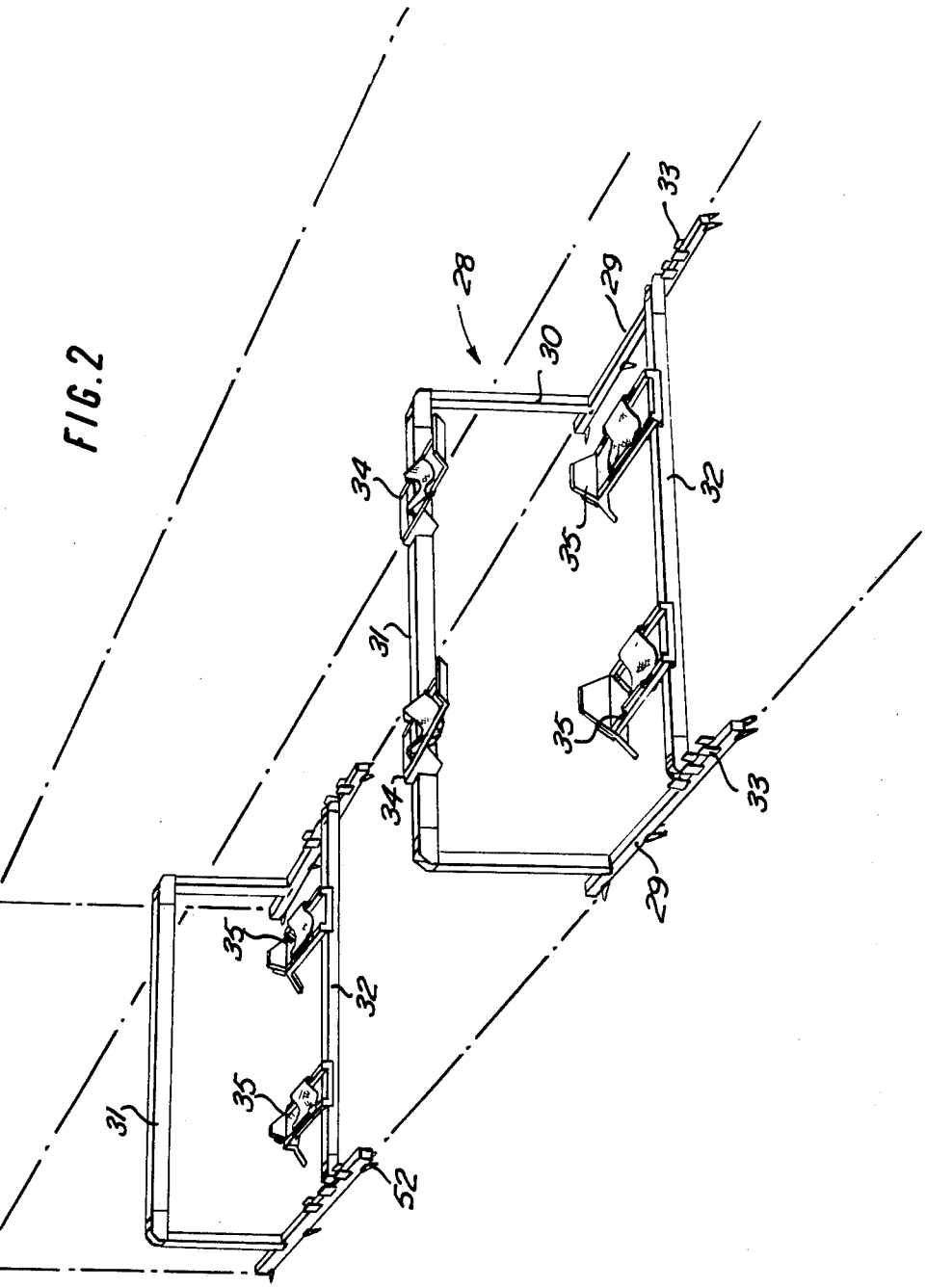

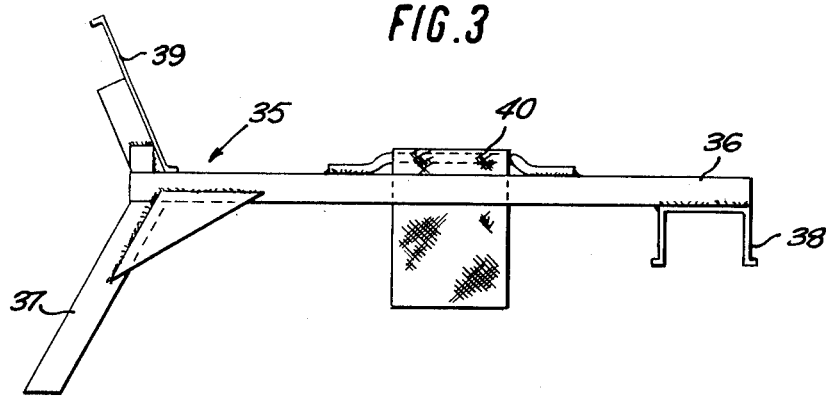
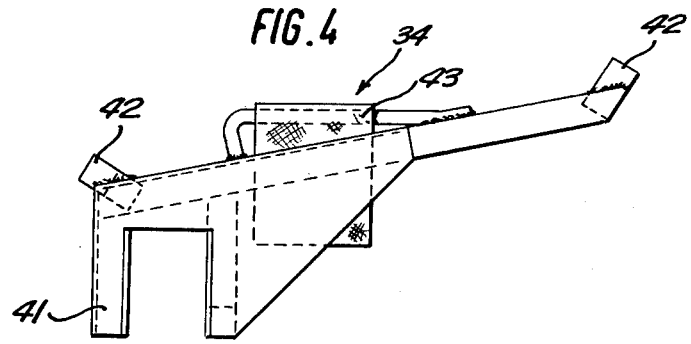
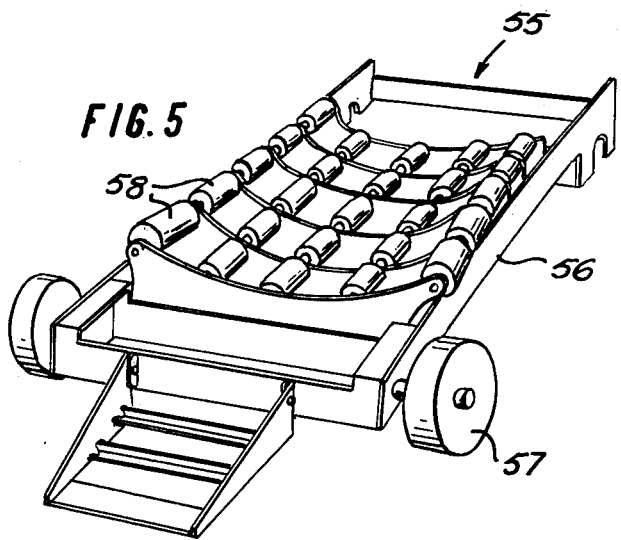

VEHICLE JACKS

BACKGROUND OF THE INVENTION

The problems of transporting vehicles fall into two main categories. First, the vehicles must be packed in such a spatial configuration that they occupy the least possible volume, being both close to each other and in the case of a containerised vehicle to a predetermined boundary surface. Secondly, the vehicles must be constrained from moving away from their stowed configuration no matter to what handling loads they are subjected in transit.

In the case of shipping containers the first condition requires some type of spatial framework allowing for double tier or inclination of the vehicles to product maximum volume utilisation. The framework should weigh as little as possible for easy handling, and disassemble to a very small volume for empty return shipment. The framework should be rigid enough to maintain its dimensions within close limits and finally, because of its inherent rigidity, it should permit any transient forces to follow a load path to the base level of the container without the need of external help from the container walls or roof.

The second condition requires that the vehicles be connected to this space frame in such a way as to prevent their relative movement during transport, so necessitating either a direct rigid tie down via the vehicle chassis to the frame; or a tie down from some part of the wheels to the frame.

A framework on which motor vehicles can be supported within a shipping container is the subject of my U.S. Pat. No. 3,869,991, Mar. 11, 1975.

The present invention relates to a jack member two of which can be used together with the aforementioned framework to load and unload vehicles. To accomplish the loading the jack members are used to raise a vehicle to a position inclined to the horizontal within a container whereat they are supported by the framework. Conversely, to unload a container the jack members are used to lower the vehicles from their inclined, stowed position so that they can be driven out from the container.

A lifting jack which can be used to raise and lower a vehicle to and from a position inclined to the horizontal is disclosed in U.S. Pat. No. 3,780,987 (Craft et al) and No. 2,489,056.

Craft et al teaches a low profile lifting jack which is particularly useful for lifting vehicles having a small ground clearance such as forklift trucks. In use, this type of lifting jack normally is manually positioned beneath a vehicle which is to be raised and then operated to lift the vehicle. The jack member according to the present invention is intended for operation in a confined space and, in use, two such members are first located in accordance with the track of the vehicle which is to be raised whereafter the vehicle is driven onto the jack members. The vehicle automatically is positioned so that it can be lifted together with a part of its support framework. The framework is erected whilst the jack members hold the vehicle and when the framework is assembled to support that vehicle the jack members are removed.

The members are of adjustable length so that vehicles of different wheel base can be accommodated.

Stewart teaches a wheeled truck jack in which a lifting arm of the jack is adjustable in length. The purpose of this provision in the wheeled truck jack is to enable different lift heights to be obtained. In the jack member according to the present invention the provision of adjustability cannot effect the lift height of the jack member. The lift height remains constant is necessitated by the height of the framework which is to support a raised vehicle.

The invention provides a jack member for use in raising and lowering a vehicle to and from a position inclined to the horizontal, the jack member comprising an elongate approach ramp, an elongate lifting ramp, pivoting means extending transversely of the longitudinal axes of said ramps, whereby said ramps are connected together adjacent one of their ends, a pressure fluid ram pivotally connected to the ramps to rotate said lifting ramp with respect to said approach ramp from a first position to a second position, said lifting ramp including a surface defining a track along which track a vehicle wheel can run when the jack member is in its first position, support means provided at the said one end of said lifting ramp to receive means for cradling said vehicle wheel, and means allowing said wheel cradling to come into supporting engagement with said vehicle wheel when said pressure fluid ram has rotated said lifting ramp from said first position, in which said vehicle wheel runs along said ramps, into said second position in which the said one ends of said ramps are raised above their other ends.

One embodiment of a jack member for raising and lowering a vehicle will now be described, by way of example, with reference to the accompanying drawings, in which:

FIG. 1a is a partial side view of a part of a jack member, for raising and lowering a vehicle, FIG. 1b is a partial plan view of the part jack member shown in FIG. 1a, FIG. 1c shows the free end of a jack member lifting ramp, FIG. 2 shows the vehicle and wheel supporting frames, FIG. 3 shows a wheel support frame for engagement with the vehicle support frame and container floor, FIG. 4 shows a wheel support frame for engagement with another part of the vehicle support frame, FIG. 5 shows a wheel guiding device, and FIG. 6 to 9 show the lifting sequence of a vehicle by two of the jack members only one of which can be seen.

Referring first to FIG. 1a of the drawings, there is shown a jack member 10 comprisng an elongate approach ramp 11 and an elongate lifting ramp 12. The ramps 11, 12 are pivotally connected adjacent one of their ends by a pivot 13 extending perpendicularly to the longitudinal axes of the ramps. Ramp actuating means which comprises pressure fluid ram 14 is also pivotally connected between the approach and lifting ramps 11, 12 by pivots 15 and 16 extending parallel to pivot 13. In FIG. 1b it will be seen that the ram 14 lies within two cheek plates 17, 18 which extend from the lifting ramp 12. The pivot 15 extends through both plates and through one end of the ram and the pivot 16 connects the other end of the ram to the approach ramp 11. Pivot 13 extends through both cheek plates 17, 18 of the lifting ramp 12 and through two longitudinal side walls of the approach ramp which extend between the cheek plates. A wheel cradle support arm 19 extends longitudinally from and is integral with each cheek plate to flank a wheel ejector device 20 which forms a part of the approach ramp 11. A beam receiving slot 8 having a roller 9 mounted therein is formed in the wheel cradle support arms 19 adjustably to receive a beam as hereinafter described.

The lifting ramp 12 extends longitudinally from within the cheek plates and comprises box section telescopic leg 21 terminating in an upswept arcuate arm 22 which is secured to the end of the telescopic leg. The arm 22 constitutes a further wheel ejector device and is best seen in FIG. 1c.

At least one elongate roller 50 extends longitudinally of the lifting ramp 12 to engage with a vehicle wheel as it moves along the upper surface of ramp 12, which defines a track for a vehicle wheel, and so assist in guiding the vehicle along the jack member (FIGS. 6 and 7).)

A wheel guiding device 55 is shown in FIG. 5 which is fitted adjacent the wheel ejector device 20 to assist in aligning a vehicle wheel with the ramps 11, 12 of the jack member by providing a portion of the approach ramp surface. The device 55 comprises a trolley body 56 having slotted side wall members which slots engage pins provided on either side of the approach ramp (FIGS. 1a and 5). The trolley body 56 is provided with wheels 57 to allow it to be easily moved and further wheels or rollers may be provided to allow it to be swung transversely with respect to the jack member. A number of rows of rolling elements 58 are disposed with their axes generally parallel to the longitudinal axis of the jack member to provide a diverging track and are mounted so as to rotate when a vehicle wheel moves along the trolley body 56.

Other roller devices may be positioned at spaced locations under the jack member to allow it to be more easily moved.

Referring now to FIG. 2 of the drawings there is shown a vehicle support frame 28. Two such frames 28 are normally required to support a vehicle in a container.

Each frame comprises a pair of support feet 29 from each of which a holding leg 30 extends perpendicularly and is disposed adjacent one end of a support foot 29. A number of spikes 52 protrude at an angle from the underside of each support foot 29 to more firmly locate the support foot on a container floor when the vehicle support frame is loaded. The frame further comprises two transverse beams 31, 32. One beam 31 is adapted to be detachably connected at each of its ends to the free end of a holding leg 30. Taper wedge joints are used to connect the beam to the holding leg and are able, in the loaded position, to transmit all the transient loading stresses as bending moment whilst maintaining their rigidity. The other beam 32 is adapted to span the support feet 29 parallel to and spaced from the beam 31. A series of upstanding plates 33 are provided adjacent one end of each support foot 29 on the inner ones of which an end of beam 32 is received in one of a plurality of locations.

Two wheel cradles are normally accommodated on each transverse beam 31 32; a cradle 34 which, in this embodiment, is suitable for receiving one of the rear wheels of a motor vehicle is shown in FIG. 2 and is releasably attached to beam 31. A wheel cradle 35 suitable for receiving one of the front wheels of a next succeeding motor vehicle is releasably attached to the beam 32. The beam 32 is shown in the FIG. as being connected at the central one of its locations in the support feet 29.

A front wheel cradle 35 is shown in FIG. 3, and is adapted to extend forwardly to lower beam 32. The cradle comprises a frame 36 from one end of which extend legs 37 to rest on a container floor (not shown) and from the other end extends a channel bar 38 to locate the wheel cradle on transverse beam 32. A front stop plate 39 to abut a vehicle tire and assist in preventing the wheel from leaving the front end of the cradle (on the left hand side as seen in FIG. 3) also extends from the frame opposite the legs 37. A flexible plastics belt 40 extends across two frame members and is attached thereto at its ends to provide a "hammock" for a vehicle wheel. The belt is designed to conform to the shape of a tire profile and does so over a sufficient area of tire to avoid creating an appreciable flat on the tire in transit. Relative movement of the vehicle and frame is largely prevented in that the frame of the cradle is so sized snugly to receive a vehicle wheel.

Metal to rubber contact is prevented by providing multiple layers of plastics on the belt 40 between the cradle frame and the vehicle tire.

A rear wheel cradle 34 similar to cradle 35 is illustrated in FIG. 4 and is adapted to extend rearwardly of the beam 31. Cradle 34 also comprises a frame, whose channel bar 41 is strengthened as compared with cradle 35 and is not provided with support legs but locates on beam 31 to act as a cantilever support. Under load this cradle puts the beam 31 in torsion and helps to lock the taper joints at the top and bottom of the holding legs 30. Cradle 34 is further provided with wheel stops 42 at each end of the frame and a flexible belt 43 to support a wheel.

To load and support a vehicle on a vehicle support frame 38 two jack members 10 are placed side by side and the telescopic lifting ramp 12 of each jack member manually is adjusted having regard to the wheel base of the vehicle which is to be lifted.

Referring now to FIGS. 6 to 9, a pair of support feet 29 are then positioned astride the ends of the lifting ramps of the jack members, the beam 32 being connected across the feet and located on one of the inner plates 33 or slots 33a provided. A pair of wheel cradles 35 are so positioned on the beam as to align with the front wheels of the vehicle and the jack members so positioned that the upswept ejector arms 22 on each jack are located beneath the flexible belt 40 on each wheel cradle, as seen in FIG. 6.

Figure 7:
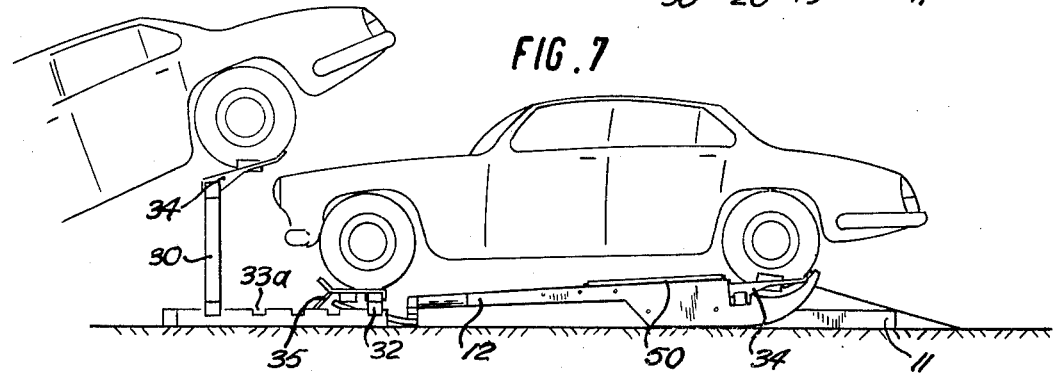

A transverse beam 31 is connected across the jack members 10 with each of its ends located on the roller 9 in receiving slot 8. The rear wheel cradles 34 are spaced on beam 31 to correspond to the wheel track of the vehicle prior to the vehicle being driven onto the jack members. However, the rear wheel cradles have been omitted from FIG. 6 in order to more clearly show the position of the wheel ejector device. When attached on the beam the cradle frame rests on both the wheel cradle support arms 19, and, with the jack in its initial rest position, surrounds the wheel ejector device 20 of the approach ramp on which the vehicle wheel is to be initially supported. A vehicle is then moved along the jack members and brought to rest such that the front vehicle wheels are each supported by upswept arm 22 in a wheel cradle 35 and the rear vehicle wheels are each positioned over a wheel cradle 34 and supported on the ejector device 20 of the respective jack member with the flexible belts of the wheel cradle 34 interposed between the ejector device 20 and the vehicle wheel as seen in FIG. 7.

The trolley body 56 of the jack member can be attached to the approach ramp of each jack member and as a vehicle approaches the ramps with one pair of wheels on the bodies 56 the trolley body will center itself in accordance with the wheel track and thereby cause the beam 31 together withits wheel cradles 34 to move on rollers 8 relative to the jack members. The vehicle is thereby correctly aligned for movement along the jack. However, for clarity the trolley body 56 has been omitted from FIGS. 6 to 9. Longitudinal rollers 50 assist in keeping the vehicle aligned as it proceeds along the top track surface of the lifting ramp 12 (FIGS. 1 and 6).

Figure 8:
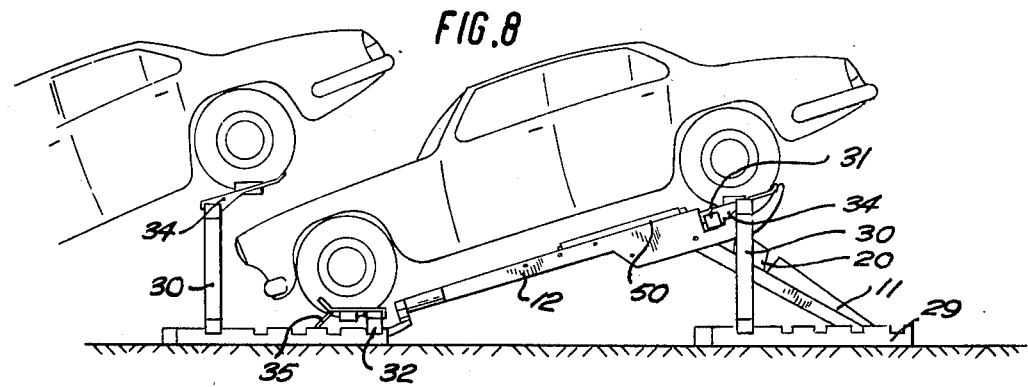
Figure 9:
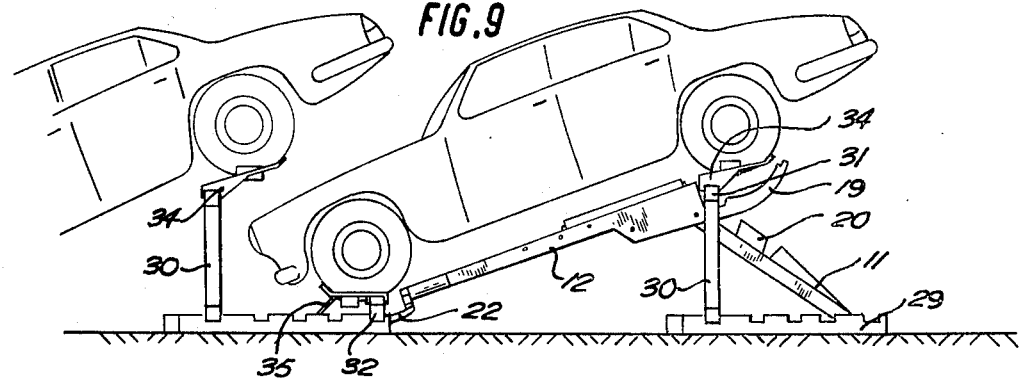

The fluid pressure rams 14 are then operated simultaneously by suitable means to extend the rams and thereby raise the jack members to a second elevated position (FIG. 8). In operation the lifting ramp 12 rotates with respect to the approach ramp 11 about pivot 13 so that the connected ramp ends rise whilst the other ends of the ramps remain on the container floor.

As the jack members rise to their second elevated position the transverse beam 31 is lifted by wheel cradle support arm 19. Thus after some raising movement the rear vehicle wheels will no longer be supported by the ejector devices 20 see FIG. 8 of the respective jack members but will have come into supporting engagement with the rear wheel cradles in which the flexible belt provides a hammock for the wheel.

The upswept arm 22 of the lifting ramp 12 of each jack member which initially supports a vehicle front wheel will, during the lifting motion, pivot about its point of contact with the container floor since the pivoted end of the lifting ramp is being raised. Thus the free end of the upswept arm of each jack member will no longer support a vehicle wheel in its front wheel cradle after some lifting motion has taken place and the wheel will then be supported by the flexible belt of its associated cradle.

This position of the vehicle can be seen in FIG. 8 which shows the vehicle supported in the wheel cradles with the support from moved into position ready to take the load. When the vehicle is at the required inclination a further pair of support feet 29 are positioned so that beam 31 can be supported at each of its ends of the holding legs 30 of the feet (see FIGS. 2 and 9). The rams are again operated to lower the jack members 10 which can then be removed. A further vehicle can be supported so that its front wheels are held supported on a transverse beam connected to the rear support feet of the vehicle immediately forward of it. In this way a number of vehicles can be supported in-line and at an angle to the horizontal, each vehicle contributing to the rigidity of the frame structure by providing a connecting link between successive pairs of support frames 28.

When a vehicle is unloaded it is lowered from the support frames and the jack members are again required to lift and hold transverse beam 31 whilst the rear holdng legs 28 of the last in-line vehicle are removed and the vehicle lowered by the jack members. As the jack members reach their initial rest position (FIGS. 6 and 7) the front wheels are brought into engagement with upswept arms 22 so that they are no longer supported by the flexible belts of the front wheel cradles and the rear vehicle wheel into engagement with the wheel ejector device 20, with the flexible belt interposed between the device 20 and the vehicle wheel, so that they are no longer supported on their respective wheel cradle belts but are gradually ejected from their rear wheel cradles 34 as the jack members reach their initial lowered position. The vehicle can then be moved down the approach ramps 11 of the jack members and off the container.

It will be appreciated that the whole supporting apparatus is easily dismantleable and the parts thereof can be closely packed for stowage in a container after delivery of the vehicles carried thereby.

It is, furthermore, envisaged within the scope of the invention that vehicles other than motor vehicles can be supported and transported on the apparatus, assuming that they are provided with means suitable for location in the wheel cradles or the wheel cradles are replaced by other suitable means.

We claim:

1. A jack member for use in raising and lowering a vehicle to and from a position inclined to the horizontal, the jack member comprising an elongate approach ramp, an elongate lifting ramp, pivoting means extending transversely of the longitudinal axes of said ramps, whereby said ramps are connected together adjacent one of their ends, a pressure fluid ram pivotally connected to the ramps to rotate said lifting ramp with respect to said approach ramp from a first position to a second position, said lifting ramp including a surface defining a track along which track a vehicle wheel can run when the jack member is in its first position, support means provided at the said one end of said lifting ram, to receive means for cradling said vehicle wheel, and means allowing said wheel cradling means to come into supporting engagement with said vehicle wheel then said pressure fluid ram has rotated said lifting ramp from said first position, in which said vehicle wheel runs along said ramps, into said second position in which the said one ends of said ramps are raised above their other ends.

2. A jack member as claimed in claim 1 further comprising means for altering the length of said lifting ramp.

3. A jack member as claimed in claim 2 wherein said support means comprises two arcuate arms extending side by side and longitudinally from the pivotally connected end of the lifting ramp to flank a part of the approach ramp.

4. A jack member as claimed in claim 1 further comprising two side wall members extending from the lifting ramp, said pressure fluid ramp lying between said side walls and pivotally connected at one of its ends to said side walls, the other end of the ram being pivotally connected to said one end of the approach ramp.

5. A jack member as claimed in claim 1 wherein said means for allowing said wheel cradling means to come into supporting engagement with said vehicle wheel comprises wheel ejector means which constitutes a part of the approach ramp surface adjacent said pivotal connection and which, when the jack member is in its first position, is flanked by said two wheel support arms.

6. A jack member as claimed in claim 1 further comprising an upswept arm connected at the free end of said lifting ramp for use as a further wheel ejector means.

7. A jack member as claimed in claim 1 further comprising a vehicle wheel guide device releasably attached to the free end of said approach ramp, said device comprising a diverging track with the smaller end thereof aligned with said approach ramp.

8. A jack member as claimed in claim 7 further comprising a plurality of rows of rolling elements rotatably attached to the said diverging track for rotation with their axes generally parallel to the longitudinal axis of said approach ramp so as to center a vehicle wheel on said ramps.

9. A jack member as claimed in claim 1 further comprising beam receiving means in said support means adjustably to accommodate one end of a beam on which beam said wheel cradling means is located.

* * * * *

UNITED STATES PATENT AND TRADEMARK OFFICE
CERTIFICATE OF CORRECTION

PATENT NO. : 4,030,697
DATED : June 21, 1977
INVENTOR(S) : Christopher Thomas ROBINSON It is certified that error appears in the above-identified patent and that said Letters Patent are hereby corrected as shown below:

On the title sheet, insert the following:

--[30]   Foreign Application Priority Data

June 21, 1972   United Kingdom ...... 29171/72--

Column 1, immediately beneath the title, insert the following:

--This is a continuation-in-part of application Serial No. 371,704, filed June 20, 1973 and now abandoned.--

Signed and Sealed this

Seventeenth Day of January 1978

[SEAL]

Attest:

RUTH C. MASON
*Attesting Officer*

LUTRELLE F. PARKER
*Acting Commissioner of Patents and Trademarks*